March 4, 1941. H. V. HEDEEN 2,234,121
SEALING STRIP AND JOINT
Filed April 25, 1940 3 Sheets-Sheet 1
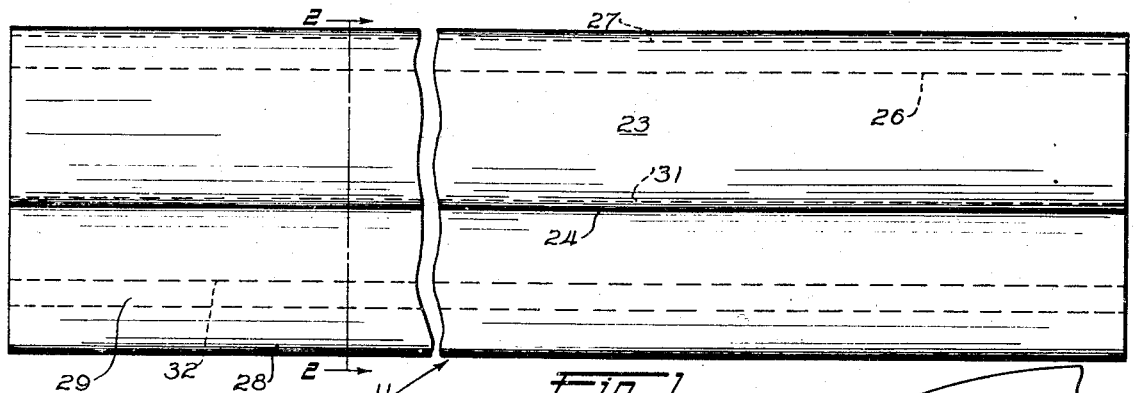
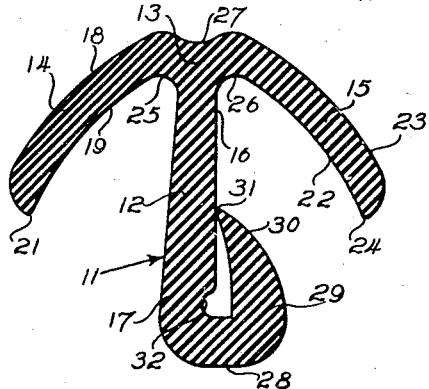
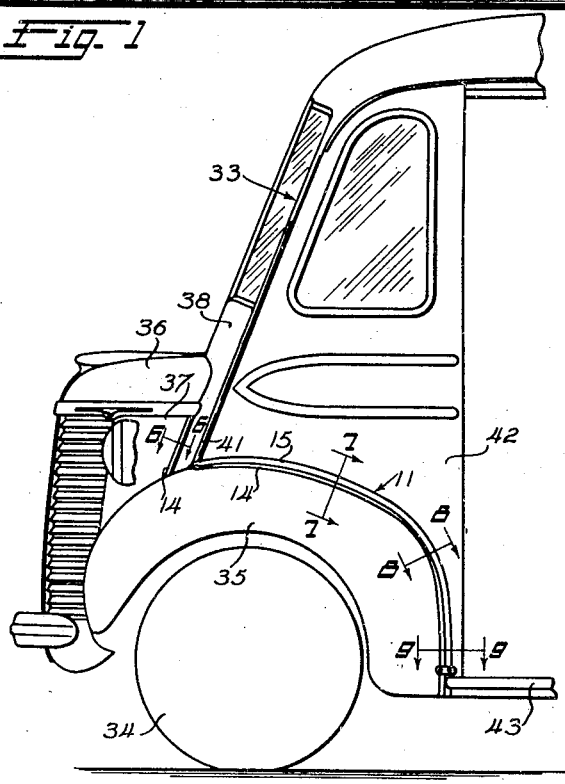
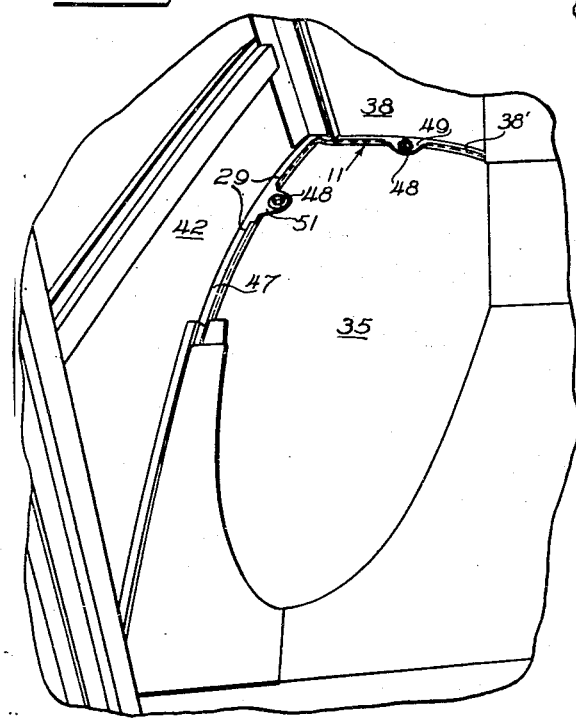
Inventor
Henry V. Hedeen
By Strauch & Hoffman
Attorneys March 4, 1941.  H. V. HEDEEN  2,234,121
SEALING STRIP AND JOINT
Filed April 25, 1940   3 Sheets-Sheet 2

Inventor
Henry V. Hedeen
By Strauch & Hoffman
Attorneys

March 4, 1941. H. V. HEDEEN 2,234,121
SEALING STRIP AND JOINT
Filed April 25, 1940 3 Sheets-Sheet 3

Inventor
Henry V. Hedeen
By Strauch & Hoffman
Attorneys

Patented Mar. 4, 1941

2,234,121

UNITED STATES PATENT OFFICE 2,234,121

SEALING STRIP AND JOINT

Henry V. Hedeen, Detroit, Mich., assignor to Divco-Twin Truck Company, Detroit, Mich., a corporation of Michigan Application April 25, 1940, Serial No. 331,643

6 Claims. (Cl. 280—153.5)

This invention relates to flexible sealing strips and joints embodying the same and is more particularly concerned with flexible strips for sealing joints between intersecting or abutting panel or like surfaces.

As its preferred embodiment, the invention will be described as a flexible sealing strip providing a dirt and water-tight seal between intersecting vehicle panels such as the body walls and front fenders of a delivery truck. It will be understood, however, that the invention is capable of being used to seal a joint between the edges of any adjacent surfaces.

Many different types of flexible strips especially designed and intended for providing weatherproof joints between adjacent panels of automobiles have heretofore been proposed, but most of these have proved unsatisfactory in that they are not uniformly tight and reliable in their sealing action especially where the strips are applied along joints of rapidly changing curvature.

With the defects of such prior structures in mind, it is a major object of the present invention to provide a flexible sealing strip capable of conforming to joints of rapidly changing curvature, and at the same time provide an extremely effective dirt and water-tight seal therefor.

A further object of the present invention is to provide a flexible sealing strip for a joint between intersecting panel or like surfaces which is inexpensive and simple in construction and easily applied, and which provides a tight seal for the joint regardless of the relative curvature or angularity of the panel or like surfaces at opposite sides of the joint, and regardless of changes in direction of the joint.

A further object of the invention is to provide a flexible sealing strip of novel construction comprising a longitudinal body portion having a pair of spaced wings extending in laterally opposed direction from one edge to overlie and tightly grip smooth panel or like surfaces at opposite sides of a joint in sealing engagement therewith, and provided with a weakened portion adjacent the juncture of the wings and body portion facilitating relative angular displacement of the wings in conformance with the relative contour and angularity of the surfaces at opposite sides of the joint. Preferably this weakened portion comprises a longitudinally extending groove or recess located in alignment with the base of the body portion and substantially medially between the wings.

A further object of the invention is to provide a novel sealing strip of rubber or like material having a longitudinal body portion and opposed lateral surface sealing wings along the base of the body portion, the wings being of considerably greater flexibility than the body portion.

A further object of the invention is to provide a flexible sealing strip of novel construction having a body portion provided with opposed laterally extending wings along one edge, wherein the body portion has a relatively narrow waist adjacent that edge and a thicker portion adjacent its free edge. In the preferred embodiment, the body portion tapers outwardly from said one edge.

It is a further object of the invention to provide a novel joint construction between adjacent panel or like surfaces wherein a sealing strip, comprising a longitudinal body portion having a pair of laterally opposed wings along one edge to overlie the surfaces at opposite sides of the joint, is positioned with the body portion interiorly of the joint so as to be clenched between the panels. Preferably the body portion tapers outwardly from the base so that only a thickened section is compressed by the panels and the thinner section adjacent one edge is free to shift or flow bodily longitudinally of the strip to a limited extent, and thereby enable self-adjustment of the strip to conform to changes in curvature of the joint without objectionable bunching or undue strain.

Further objects of the invention will presently appear as the description proceeds in connection with the appended claims and the annexed drawings in which:

Figure 1 is a side elevation of a preferred embodiment of the sealing strip of my invention;

Figure 2 is a section along line 2—2 of Figure 1, illustrating the contour of the sealing strip in relaxed condition;

Figure 3 is a side elevation of the front end of a delivery truck illustrating my sealing strip in operative position, in the joint between the lower edges of the body walls and the front fender at one side;

Figure 4 is a fragmentary perspective view of the body interior at the left front corner;

Figures 1 and 2 illustrate the preferred form of a flexible strip of my invention as it appears in relaxed condition. These strips may be supplied in predetermined lengths for certain purposes, or as long continuous strips to be kept in stock and cut off in desired lengths as used.

Figure 5:
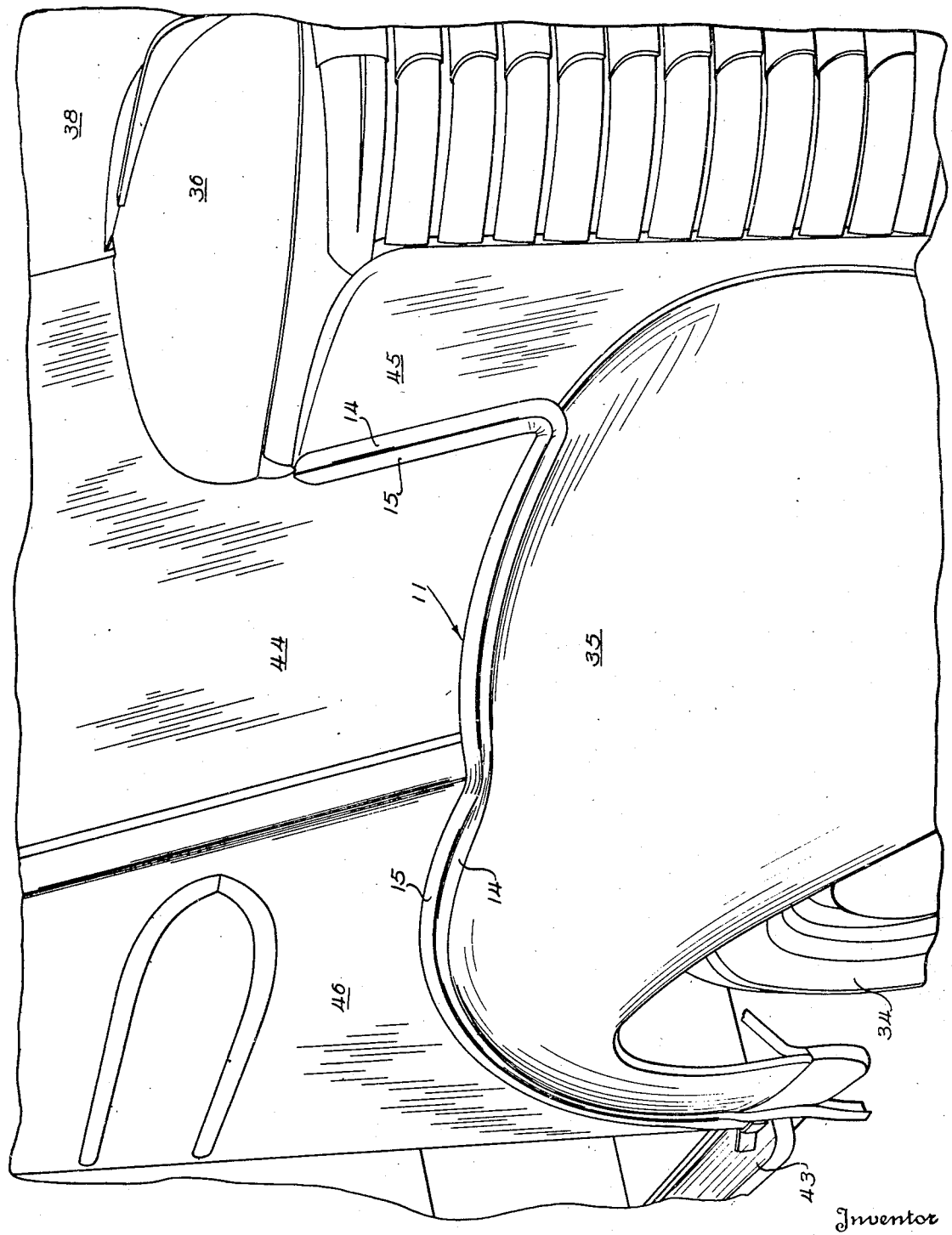
Figure 5 is a perspective view of the right front corner of the truck of Figure 3, illustrating how the strip conforms readily to sharply bending joint corners without materially altering its neat external apearance or affecting the tightness of the joint.

The strip is preferably made of rubber or some similar flexible elastic material which will readily conform to the angles and curvatures of the surfaces it engages, and which has sufficient inherent resiliency to strongly tend to return to its relaxed shape while deformed and thus provide a self-tightening joint without employing special fastening means.

When made of rubber, the strip is preferably formed integrally by molding or extruding the material while in plastic state through a die of suitable shape, after which it is vulcanized, cured and finished by conventional methods. It is essential that a high grade of rubber be used in the strip to withstand sharp permanent bending and also extreme weather conditions to which the exterior of the vehicle is subjected. For efficient sealing and long life, I have found it satisfactory that the strip be made of soft, black, non-blooming rubber, having a hardness of 50 to 60 durometer, and which will withstand without cracking thirty days exposure to atmosphere conditions and the equivalent of Florida sunshine while bent around the two inch diameter support.

Referring mainly to Figure 2, strip 11 comprises a longitudinal body portion 12 having at one edge a base generally designated at 13. From opposite sides of base 13 extend arcuate wings or sealing flanges 14 and 15 respectively.

Body portion 12 is preferably formed with a thin-waisted section 16 adjacent base 13 and a thicker section 17 adjacent the outer edge. Preferably the body portion tapers uniformly outwardly from waist 16 to the thicker section 17.

Each wing 14 and 15 is preferably of identical size and shape and of equivalent flexibility. Wing 14 is formed with parallel arcuate outer and inner faces 18 and 19 respectively. Outer face 18 turns abruptly inwardly at the free end of the wing to intersect face 19 and provide a relatively sharp wing tip edge designated at 21.

Similarly wing 15 is formed with parallel inner and outer arcuate surfaces 22 and 23, respectively, and terminates in a sharp wing tip edge 24.

Wings 14 and 15 as illustrated in Figure 2 are therefore of uniform thickness from base 13 to their respective wing tips and are inclined rearwardly toward the thicker body section so that inner wing faces 19 and 22 define acute angles with adjacent sides of body portion 12. The interior corners between wings 14 and 15 and body portion 12 are suitably rounded as indicated at 25 and 26 respectively.

Outer wing faces 18 and 23 and base 13 combine to provide an even, continuous, arcuate exterior surface for the sealing strip. The even curve of this surface is interrupted only by a shallow longitudinal groove 27 which is centrally located at the bottom of base 13 in alignment with body portion 12 midway between the wings. Groove 27 provides a weakened portion of the strip hinging and facilitating relative angular displacement and deformation of wings 14 and 15 in accordance with the relative angularity and curvature of the surfaces on opposite sides of the joint to which the strip is applied.

Wings 14 and 15 are preferably of the same thickness and have approximately the same thickness as waist section 16 so that they are appreciably more flexible than the body portion.

Adjacent section 17, body portion 12 extends laterally at 28 and then inwardly toward base 13 to provide an integral panel retaining lip 29 at the edge of the body portion opposite base 13. Lip 29, as shown in Figure 2, is spaced a substantial distance from the adjacent side wall of body portion 12 but terminates in a tapered tip 30 having a sharp edge 31 which bears directly on that adjacent body wall due to the resiliency of the rubber. This inherent resiliency tends to retain tip 30 in the position shown in Figure 2 and thereby provides a normally closed self locking panel or flange lip. Lip 29 may be omitted where no flange is available at the joint or where other devices for supporting the strip at the joint are employed.

In order to render lip 29 more easily bendable outwardly for the purpose of inserting a panel edge therein, body portion 12 is weakened as by a longitudinal groove 32 lying along the side adjacent lip 29 near the interior corner formed by lateral section 28. If desired, groove 32 may be formed on section 28 or lip 29.

A practical strip which has been found very satisfactory for sealing the joints between exterior walls of a delivery truck body and the chassis front fenders comprises a rubber strip of the above described quality and the shape illustrated in Figure 2 having the following dimensions. The full length of the body portion 12 is about 1⅛ inches, while the wings in relaxed position have a span of about 1¼ inches. Wings 14 and 15 are each disposed at an angle of about 45 degrees to the adjacent body side and the wings and waist 16 are about ⅛ inch thick. At its thicker section 17, the body portion is about $\frac{7}{8}$ of an inch thick. Lip 29 is about ⅜ inch long.

The above-described strip may be employed to seal the joint between any adjacent panel or like surfaces regardless of the relative contour of those surfaces and regardless of any changes in direction or curvature of the joint. Application of such strips for weather tight sealing of the joints between the front corners of an automobile body, the engine hood and the front fenders beneath the corners will now be described as a preferred embodiment.

Referring to Figure 3, a special box-like delivery truck body 33 is illustrated as mounted upon a conventional automotive chassis supported by front wheels 34. This chassis has attached thereto the usual rounded front fenders 35 and a short engine hood 36 representing the conventional hood cut-away to conform to the front end of the special body. Body 33 is of the type which extends laterally over the wheels and houses substantially the entire chassis including the forwardly disposed engine. The novel features of this body are described and claimed in my copending application Serial No. 333,661 filed May 6, 1940.

The short engine hood covers the protruding radiator and engine fan assembly.

In assembling this vehicle, the conventional chassis is prepared simply by shortening hood 36, and then body 33 is dropped directly upon the chassis. The lower edges of the sheet metal body front and side walls, while shaped closely to the contour of adjacent chassis parts, usually do not fit with them with such accuracy as to provide weather and dirt-tight joints because of manufacturing tolerances and variations in size and shape of both body and chassis. Metal-to-metal joints are objectionable as they soon become loose, noisy and rusted.

The flexible strip of the present invention is employed at these joints to effect a tight seal and at the same time render them quiet by preventing direct metal-to-metal contact and compensating for varying panel spacings along the joints. Preferably the strip is supported along the lower edges of the body to locate it in proper position for assembly as will be described.

The combined special body and chassis construction illustrated in Figure 3–5 of this application is described and claimed in my co-pending application Serial No. 340,395 filed June 13, 1940.

The exterior body wall surfaces are smooth and angularly disposed with respect to the adjacent smooth engine hood and fender surfaces. At the left corner of the vehicle I use a single continuous rubber sealing strip 11 which extends from the top edge of the hood side panel 37 downwardly and forwardly along the slope of the left front body wall 38 to the point of juncture of panel 37, wall 38 and left front fender 35.

Figure 6:
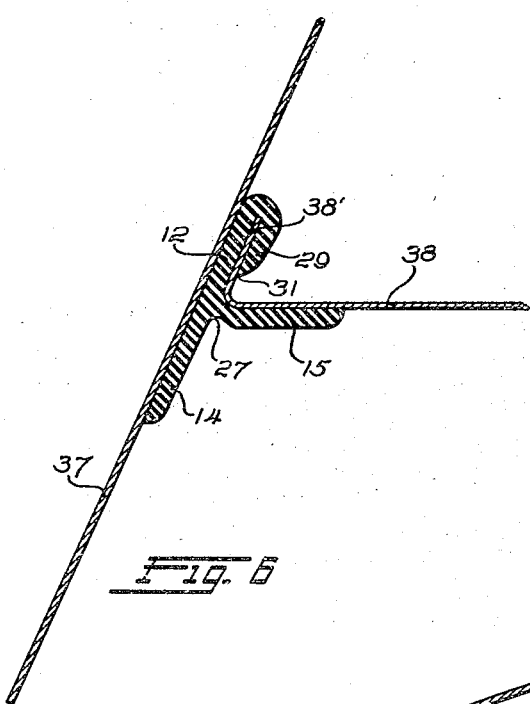
Figures 6–9 are sections taken along lines 6—6, 7—7, 8—8 and 9—9, respectively, in Figure 3 illustrating the strip in various distorted positions along the joint.

Figure 6 illustrates the manner in which the strip is distorted along this portion of the joint. Lip 29 fits over an internal generally vertical flange 38' at the edge of the hood receiving aperture in wall 38. Lip edge 31 clamps tightly on the flange and thereby locks the strip in proper location for and during assembly. Body portion 12 is compressed tightly between panel 37 and flange 38' during assembly and wings 14 and 15 are bent away from the relaxed position of Figure 2 to lie along the adjacent exterior surfaces of panel 37 and wall 38 on opposite sides of the joint. This bending is facilitated by the weakened section 27.

Due to their inherent resiliency, wings 14 and 15 strive to reassume the relaxed position of Figure 2 and are therefore under considerable tension when distorted as in Figure 6. Hence wings 14 and 15 bear tightly against the exterior surfaces of panel 37 and wall 38, respectively. While wings 14 and 15 are arcuately shaped when relaxed, they are sufficiently thin and flexible to conform in full surface engagement with the smooth panel and wall surfaces when distorted.

The chief advantage of the arcuate shape of the wings is that it enables them to conform to arcuate surfaces more readily and also gives a stronger surface gripping action adjacent the wing tips. Thus the joint seal is most effective adjacent wing tip edges 21 and 24 which are remote from the body portion and least likely to be affected by deformation of the body portion.

Leaving the hood, the strip turns sharply laterally, upwardly and rearwardly to extend along the intersection between wall 38 and fender 35 until it reaches body corner 41 where it is again bent sharply rearwardly. Lip 29 is locked on internal flange 38' extending along the lower edge of wall 38 while wings 14 and 15 bear tightly against the exterior surfaces of fender 35 and wall 38 respectively.

From corner 41, the strip extends rearwardly and slightly laterally along the intersection between the body front side wall 42 and fender 35 and then downwardly with the sweep of the fender to terminate below running board 43. Lip 29 is locked in an internal flange 47 extending along the lower edge of wall 42 while wings 14 and 15 bear tightly on the exterior surfaces of fender 35 and wall 42.

With reference to Figure 4, which illustrates the body interior at the left side corresponding to Figure 3, the front end of body 33 is preferably secured to the fenders by means of bolt assemblies 48 which pass through apertured lugs 49 and 51 on flanges 38' and 47 respectively. As shown in Figure 4, lip 29 is cut away adjacent lugs 49 and 51.

As bolt assemblies 48 are drawn tight, the thicker end section 17 of the body portion of the strip is tightly gripped and compressed between the body wall finges and the fender, but the narrow waist section 16 adjacent the sealing wings is substantially free from such gripping action and is capable of free bodily displacement or deformation longitudinally along the joint even when the strip is sharply bent to conform to rapidly changing curvatures in the joint. In this manner objectionable stresses which would be transmitted to the sealing wings if the entire body portion was clamped firmly are substantially isolated therefrom and dissipated.

This self-compensation of the strip of my invention to accommodate for rapid changes in the direction of the joint is a very important feature which renders a continuous strip practically applicable for sealing such extreme corners as the vehicle corner 41 and that at the bottom of the engine hood above described.

Figure 7:
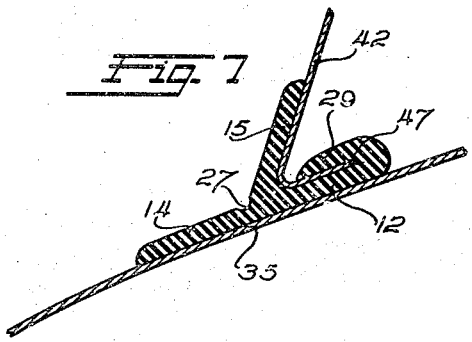
Figure 8:
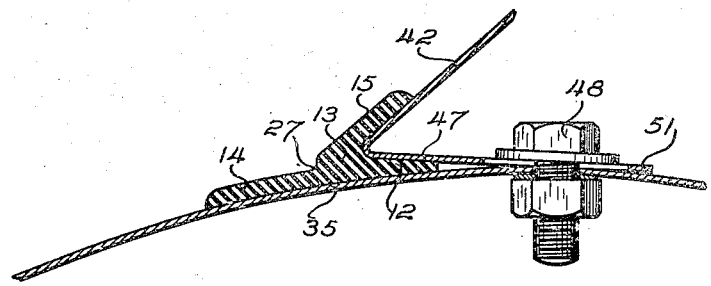

Figures 7 and 8 illustrate further the manner in which the strip is variously distorted along the intersection of wall 42 and the arcuate top surface of fender 35.

As shown in Figure 8, the body portion of the strip adjacent each lug 51 is compressed a great deal due to the proximity of clamping bolt 48. At such points a large amount of the rubber from the body portion flows outwardly to thicken base 13 considerably and aid the sealing action of wings 14 and 15.

Figure 9:
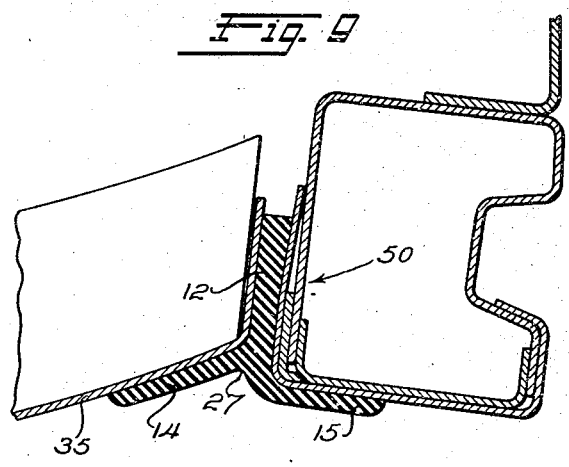

Figure 9 illustrates distortion of the strip at that portion of the joint between the inner end of the fender and the lower end of the front side door post 50 of the body. Here lip 29 is removed because post 50 is relatively deep and has no cooperating flange similar to that at 47.

Figures 6–9 illustrate that wings 14 and 15 are capable of assuming almost any relative angular position along the joint and that it is immaterial whether the surfaces at opposite sides of the joint be flat, arcuate or of different angularity or curvature. This flexibility of wings 14 and 15 is due to the weakened portion 27 which facilitates relative displacement of the about hinges medially of the strip and at the same time maintains a continuous exterior surface for the strip so that it is weather-tight.

Figure 5 illustrates a second continuous strip 11 at the right front corner of the vehicle forming the sealed joint between the right front body wall 44, the right hood side panel 45, right fender 35 and right front side body wall 46. This joint is preferably identical with that described above at the left side.

*Further embodiments*

Figure 10:
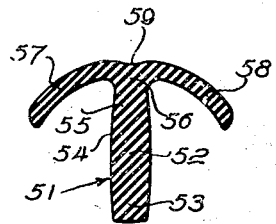
Figure 10 is a lateral section of a strip of different shape comprising a further embodiment of the invention.

Figure 10 is a section of a flexible strip 51 embodying the essentials of the invention but of somewhat different shape than that shown in Figure 2. Strip 51 comprises a longitudinal body portion 52 having a free edge section 53 of substantially uniform thickness which is connected by a tapered section 54 to a relatively thin waist section 55 adjacent its base 56. From opposite sides of the base project flexible wings 57 and 58 which are preferably of the same size and flexibility and whose thickness is substantially one-half that of the waist section 55. Wings 57 and 58 are therefore much more flexible than the body portion. Opposite the foot of the body portion is a longitudinal groove 59 located medially between the wings in alignment with the body portion for the same purpose as groove 27 above described. Strip 51 may be made with or without a panel retaining lip similar to 29 in Figure 2. In some joints, especially where the body portion of the strip is compressed between relatively deep flanges, strip 51 is preferable to that of Figure 2 because there is no necessity to remove a retaining lip. Strip 51, for and during assembly is supported along the lower body wall edges by screws or similar fastening elements.

Figure 11:
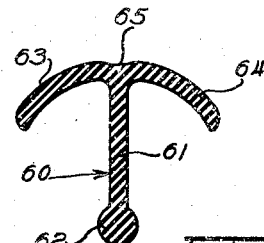
Figure 11 is a lateral section of a strip of still different shape comprising another embodiment of the invention.

Figure 11 illustrates a still further modified form of strip 60 wherein body portion 61 is of uniform thickness and is provided at its free edge with an enlarged solid bead 62. At the base of body portion 61, a pair of opposed lateral wings 63 and 64 of the same thickness and flexibility as body 61 but otherwise similar to the wings above discussed are provided, and opposite the base of body portion 61, a shallow longitudinal groove 65 similar to that at 27 extends in alignment with the body portion.

Such a strip finds use for special purposes and has been found quite efficient for sealing joints between abutting surfaces.

Advantages

My novel sealing strip is easily and quickly mounted on the vehicle body before assembly and adapts itself to the joint automatically as the body is bolted to the chassis. No special precautions need be taken at the joint corners to hold the strip from becoming dislodged outwardly or to keep the sealing wings pressed against the surfaces to be sealed because of the special self compensating action above described.

Thus, with the body portion of the strip subjected only to localize gripping at its inner thicker end and with the most effective sealing pressure of the wings being located adjacent their extreme outer ends, it will be appreciated that I have provided a novel joint construction wherein deformation of the strip to conform to changing curvatures of the joint is absorbed by intermediate portions of the strip and has the least possible effect upon its sealing function.

As best illustrated in Figure 5, the sealing strip of my invention not only provides a tight weather-proof joint but also presents a smooth, continuous exterior surface which is neat and pleasing to the eye.

A further advantage in my novel flexible strip, arising from freedom for longitudinal motion of the tapered section of the body portion is that this freedom of motion is effective to reduce wear and prevent cutting of the rubber strips at sharp corners as the vehicle parts weave during operation over uneven streets.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. An integral sealing strip of rubber or the like comprising when relaxed a laterally straight longitudinal body portion and oppositely extending flexible lateral wings projecting from a base along one edge of said body portion, said body portion having a small waist section adjacent said base and said strip being longitudinally grooved along the foot of said base between said wings to facilitate relative angular displacement of said wings, and a resilient lip on the other edge of said body portion, said lip opening toward said base.

2. An integral sealing strip of rubber or deformable material of like characteristics comprising when relaxed a laterally straight longitudinal body portion and oppositely extending uniformly flexible lateral wings projecting from a base along one edge of said body portion, said body portion having a small waist section adjacent said base and a thicker section along its other edge, and said strip being longitudinally grooved along the foot of said base between said wings to facilitate relative angular displacement of said wings, and a resilient lip on the other edge of said body portion, said lip opening toward said base.

3. An integral deformable sealing strip for a joint of irregular shape between intersecting members having surfaces of the same or of widely varying contours and which members are secured together, comprising when relaxed a longitudinal body portion adapted to be disposed mainly interiorly of the joint having a base at that edge which is at the exterior of the joint, oppositely inclined flexible lateral wings projecting from said base and defining acute angles with said body portion, and a longitudinal surface groove in said base between said wings, said wings and groove defining a substantially continuous external exposed surface on said strip with said wings being sufficiently flexible to tightly overlie and conform to the surfaces of said members at opposite sides of the joint, and said strip being capable of conforming to rapid changes in curvature along said joint without detracting from its sealing efficiency.

4. An integral deformable sealing strip for a joint of irregular shape between intersecting members having surfaces of the same or widely varying contours and which members are secured together, comprising when relaxed a longitudinal body portion adapted to be disposed mainly interiorly of said joint having a base at that edge which is at the exterior of the joint, said body having a relatively thick inner section adapted to be securely clenched within said joint and a thinner relatively free waist section adjacent said base, oppositely inclined flexible lateral wings projecting from said base and defining acute angles with said body portion, and a longitudinal surface groove in said base between said wings, said groove and wings defining a substantially continuous external exposed surface on said strip with said wings being sufficiently flexible to tightly overlie and conform to the surfaces of said members at opposite sides of the joint, and said strip being capable of conforming to rapid changes in curvature along said joint without detracting from its sealing efficiency.

5. In the sealing strip defined in claim 4, said body portion tapering uniformly from said waist section to said thick section.

6. An integral sealing strip of rubber or the like comprising when relaxed a laterally straight longitudinal body portion and oppositely extending flexible lateral wings projecting from a base along one edge of said body portion, a longitudinal surface groove in said base between said wings, said body portion increasing in thickness outwardly of said base to a thick edge section and then turning laterally and inwardly toward said base to provide an integral resilient panel retaining lip spaced from the adjacent side of said body portion along most of its length but terminating in a thin edge maintained against said side by the resiliency of said material so as to provide a normally closed resilient mouth at said lip, and a longitudinal weakened portion on said body portion adjacent said lip.

HENRY V. HEDEEN.